United States Patent
Wang et al.

(10) Patent No.: US 8,654,186 B2
(45) Date of Patent: Feb. 18, 2014

(54) LIGHT SOURCE SYSTEM FOR DETECTING ORAL CAVITY

(75) Inventors: Hsiang-Chen Wang, Minhsiung Township (TW); Fu-Jie Hsu, Minhsiung Township (TW); Zih-Hao Ye, Minhsiung Township (TW); Fang-Hsuan Cheng, Minhsiung Township (TW)

(73) Assignee: National Chung Cheng University, Chiayi County (TW)

( * ) Notice: Subject to any disclaimer, the term of this patent is extended or adjusted under 35 U.S.C. 154(b) by 1038 days.

(21) Appl. No.: 12/656,794

(22) Filed: Feb. 17, 2010

(65) Prior Publication Data

US 2011/0199474 A1    Aug. 18, 2011

(51) Int. Cl.
*A61B 1/06* (2006.01)
*H04N 9/083* (2006.01)
*H04N 5/225* (2006.01)
*H02J 7/00* (2006.01)
*F21S 6/00* (2006.01)
*F21V 7/04* (2006.01)

(52) U.S. Cl.
USPC ............... 348/77; 348/290; 348/342; 307/66; 362/257; 362/612

(58) Field of Classification Search
USPC ........ 348/77, 290, 342; 307/66; 362/257, 612
See application file for complete search history.

(56) References Cited

U.S. PATENT DOCUMENTS

| | | | |
|---|---|---|---|
| 6,847,737 B1 * | 1/2005 | Kouri et al. | 382/260 |
| 7,272,265 B2 * | 9/2007 | Kouri et al. | 382/260 |
| 7,327,098 B2 * | 2/2008 | Chen | 315/291 |
| 7,626,688 B2 * | 12/2009 | Ou et al. | 356/73 |
| 2004/0071363 A1 * | 4/2004 | Kouri et al. | 382/276 |
| 2006/0018118 A1 * | 1/2006 | Lee et al. | 362/231 |
| 2006/0091826 A1 * | 5/2006 | Chen | 315/291 |

* cited by examiner

*Primary Examiner* — Ranodhi Serrao
(74) *Attorney, Agent, or Firm* — Bacon & Thomas, PLLC (57) ABSTRACT

A light source system for detecting oral cavity has an illumination module and a filter module. A spectral range of light is illuminated from the illumination module and filtered through the filter module. When light of such spectral range is irradiated onto a diagnostic area, high chromatic difference and contrast existing between areas with pathological change and normal areas is employed to enhance correctness of diagnoses and operations.

28 Claims, 8 Drawing Sheets

FIG. 5E

LIGHT SOURCE SYSTEM FOR DETECTING ORAL CAVITY

BACKGROUND OF THE INVENTION

1. Field of the Invention

The present invention is related to a light source system for detecting oral cavity, and more particularly to a light source system that irradiates light with a specific spectrum on a diagnostic area, and generates high chromatic difference and contrast between pathological areas and normal areas to determine if pathological change exists in tissues oral cavity.

2. Description of the Related Art

Clinically, most regular light sources pertain to tungsten lamp, xenon lamp, halogen lamp, and the like. In contrast to the aforementioned light sources, light-emitting diode (LED) lamps are advantageous in less power consumption, high emitting efficiency, durability, environmental protection, compact size, adjustable light intensity, and abundant color gamut.

As to biological medicine, there are plenty of related researches and equipment using various multi-spectral light sources to generate different biological images. Such biological images serve as references to medical personnel for determining if a diagnostic area has any abnormal pathological change.

Given enterovirus as an example, pathological changes arising from enterovirus, such as, acute pharyngitis, herpangina, hand-foot-and-mouth disease, and so on, are typical symptoms of the highly infectious disease in recent years. Above all, enterovirus is even more life-threatening to children under five. If enterovirus can be treated in the early stage thereof, the likelihood of being severe or acute is significantly reduced. Generally, one of methods for pediatricians to detect the disease is to diagnose throat, hand and mouth. As patients are usually children, regular doctors can only detect if the throat mucosae thereof have any ulcer within limited time. Therefore, if a special light source is available and using the light source intensifies the chromatic difference between an area having pathological change and neighboring normal areas, the light source can certainly assist to enhance the detection capability of doctors. Furthermore, if the operating light source system and a charge-coupled device (CCD) can be combined, doctors can carefully examine images on a computer screen or employs pattern recognition software to promptly determine if children contract enterovirus. In that case, the capability of medical personnel in detecting envirovirus of children can be significantly improved.

SUMMARY OF THE INVENTION

An objective of the present invention is to provide a light source system for detecting oral cavity, generating light in a specific spectral range illuminated by a LED light source and filtered to irradiate onto a diagnostic area so as to assist medical personnel to correctly diagnose based on chromatic difference generated between a normal area and an abnormal area.

To achieve the foregoing objective, the light source system has an illumination module and a filter module.

The illumination module has an LED unit and a power supply unit. The LED unit serves to illuminate. The power is electronically connected to the LED unit to supply power to the LED unit.

The filter module is mounted on an optical path of light illuminated by the LED unit to receive the light illuminated by the LED unit, filters a received light to generate light of a required spectral band, and outputs the light having a spectral range located within coordinates represented by x=0.22±0.05 and y=0.18±0.05 of CIE chromaticity coordinates.

Preferably, the LED unit has multiple white LEDs.

Preferably, the LED unit has multiple red, green and blue LEDs to generate white light mixed from light outputted from the multiple LEDs.

Preferably, the LED unit has multiple white LEDs and multiple red, green and blue LEDs.

Preferably, the power supply unit is an AC to DC conversion circuit.

Preferably, the power supply unit has a plurality of rechargeable batteries.

Preferably, the illumination module further comprises a CCD unit.

Given the above-mentioned light source system, a spectral range of light illuminated therefrom and outputted through the filter module is located within coordinates represented by x=0.22±0.05 and y=0.18±0.05 of CIE chromaticity coordinates. When such light is applied to detect reddish biological tissue, normal areas are brighter while areas having pathological change are darker. Such chromatic difference therebetween is employed to enhance correctness of diagnoses and operations.

DETAILED DESCRIPTION OF THE INVENTION

Figure 1:
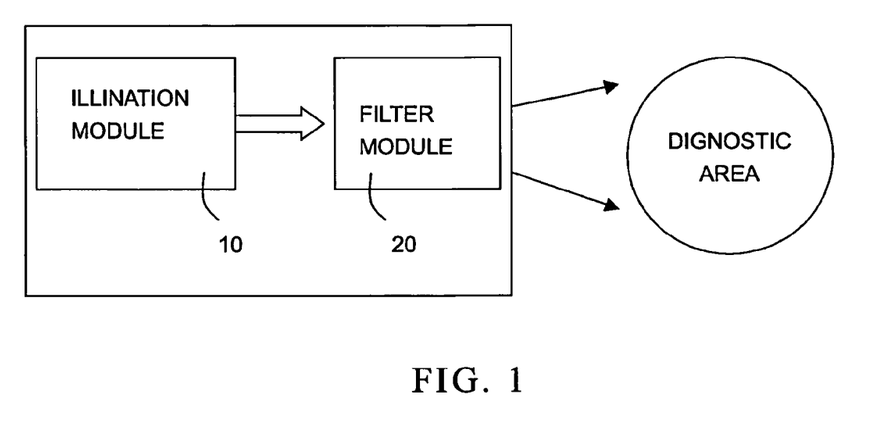
FIG. 1 is a block diagram of a preferred embodiment of a light source system for detecting oral cavity in accordance with the present invention.

With reference to FIG. 1, a light source system for detecting oral cavity has an illumination module (10) and a filter module (20). The light source system illuminates a diagnostic area to distinctly raise chromatic difference and contrast of an area having pathological change and a normal area, thereby assisting medical personnel to determine if the pathological change does exist.

Figure 2:
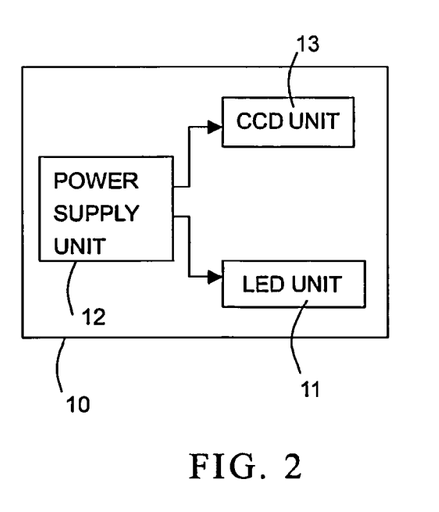
FIG. 2 is a block diagram of a lighting module in FIG. 1.

With reference to FIG. 2, the illumination module (10) has an LED unit (11) and a power supply unit (12), or further has a CCD (couple-charged diode) unit (13). The LED unit (11) serves to illuminate and has but not limited to multiple white LEDs or multiple red, green and blue LEDs or multiple white LEDs and multiple red, green and blue LEDs so as to irradiate white light generated directly or mixed therefrom. The power supply unit (12) is electronically connected to the LED unit to supply power to the LED unit (11) and may be an AC to DC conversion circuit to output a DC voltage, or may be a plurality of rechargeable batteries. If further having a CCD unit (13), the illumination module (10) serves to both illuminate and shoot. Image files or images taken are forwarded to a back-end image processing system to compute so as to obtain a comparison result. The compared images are further presented in collaboration with a display device so that medical personnel can make judgment based on images displayed on the display device.

Figure 3:
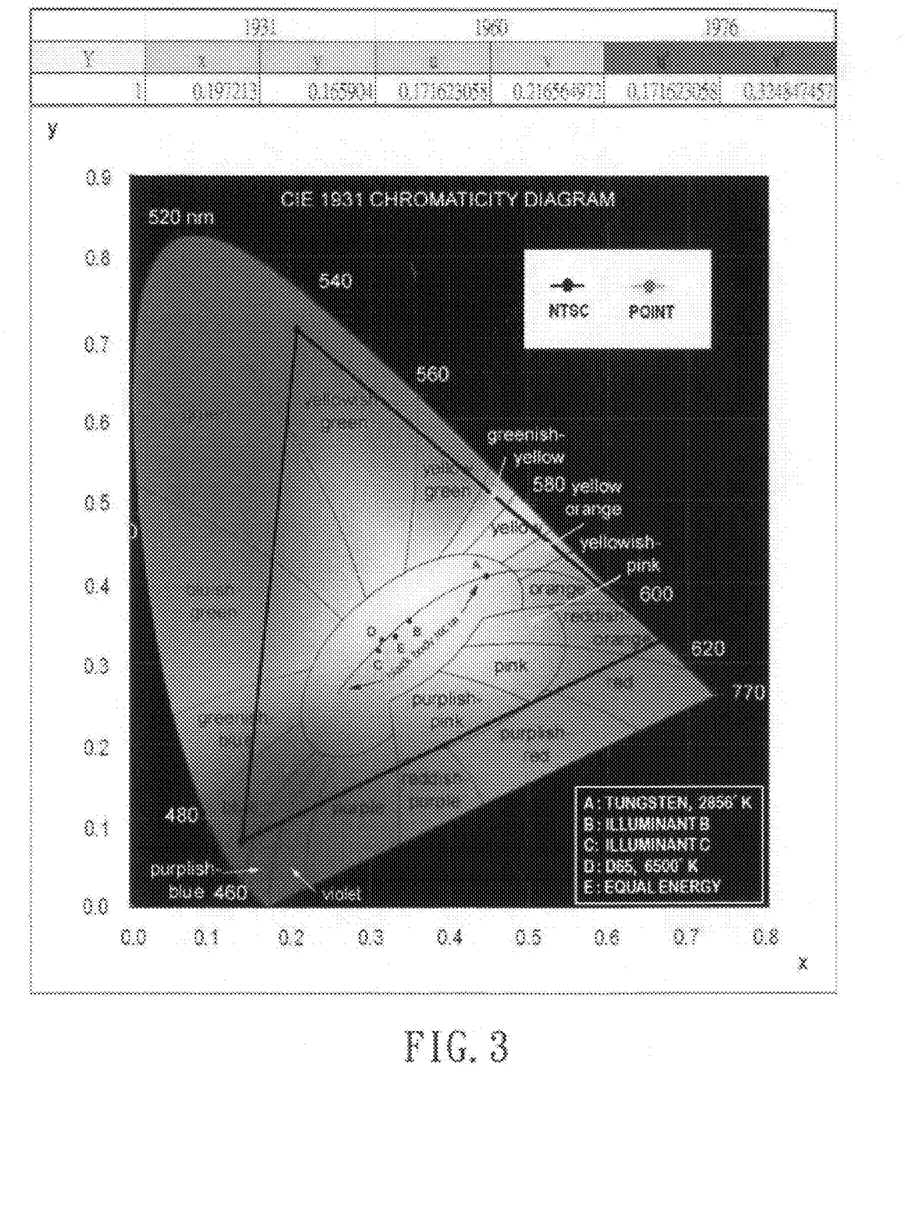
FIG. 3 is a chromaticity diagram of a spectral range of light illuminated by the present invention and located at a set of coordinates (x=0.22±0.05, y=0.18±0.05) in the CIE chromaticity coordinates.

The filter module (20) is mounted on an optical path of light illuminated by the illumination module (10) to receive the light illuminated by the illumination module (10) and filter a received light to generate light of a required spectral band. In an embodiment, the filter module (20) is a filter as shown in FIG. 3. Revealed by the test of the present invention, a spectral band of light illuminated by the light source system and passing through the filter or the spectral band of light on images, falls in a range specified by a collection of $x=0.22\pm0.05$ and $y=0.18\pm0.05$ of the CIE chromaticity coordinates. Light in such spectral range applied to regular reddish biological tissue makes areas with pathological change more reddish, and thus effectively enhances chromatic contrast between areas with and without pathological change, thereby raising correctness of diagnoses and accuracy in operations. A set of chromaticity coordinates represented by $x=0.197213$ and $y=0.165904$ as specified in FIG. 3 is one of the examples.

Given images of oral cavity of human body as an example, six types of light sources containing a yellow lighting device having tungsten lamp, a LED lighting device, and a LED lighting device respectively illuminating through a red filter, a green filter, a blue filter and yellow filter, are adopted to perform image analysis of images of oral cavity. The LED lighting device is further classified into two types, that is, bluish white LED and white LED.

Figure 4A:
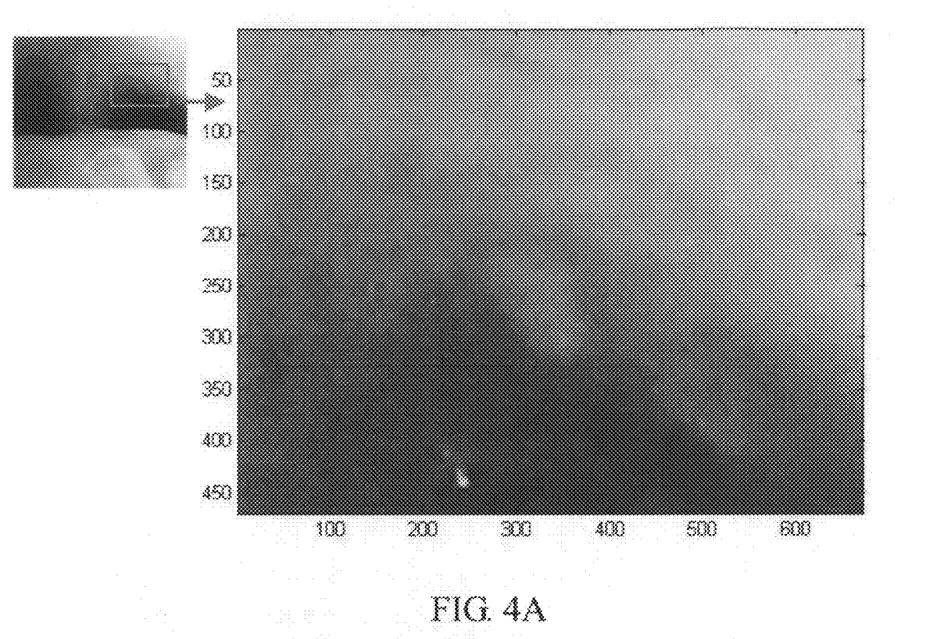
FIGS. 4(A)~4(F) is a series of oral cavity images taken by applying a yellow flashlight and a bluish white LED collaborated with different filters.

With reference to images in FIG. 4(A)~4(F), description therefor is as follows:

(A) The light source is the yellow lighting device. As yellow lighting devices are broadband light sources, color rendering thereof is relatively higher. So, the chromatic difference between the area having pathological change and normal tissue is not significant.

Figure 4B:
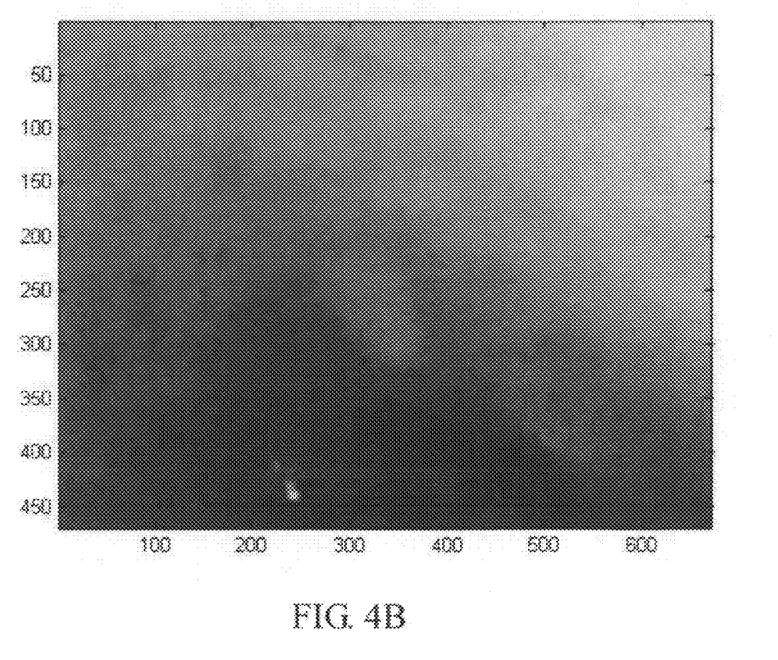

(B) The light source is the bluish white LED. As signals of blue spectral band are stronger, color rendering thereof is worse than broadband light sources. So, the chromatic difference between the area having pathological change and normal tissue is not as noticeable as in 4(A).

Figure 4C:
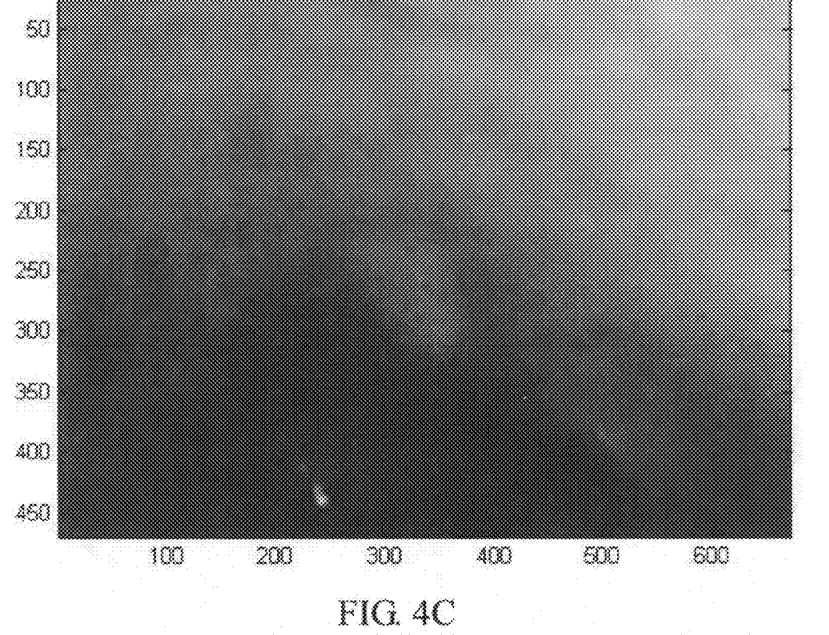

(C) The light source is the bluish white LED collaborated with a red filter. The oral image becomes more reddish. The oral image originally appears to be red, adding that the incorporated red filter makes the color of the oral image even more saturated. So, the area having pathological change is not easy to be recognized by naked eyes.

Figure 4D:
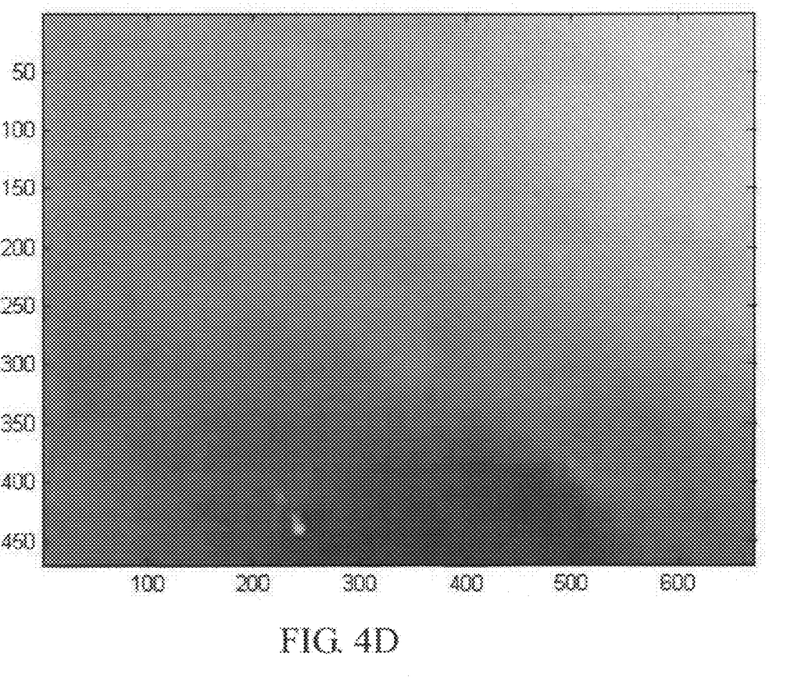

(D) The light source is the bluish white LED collaborated with the green filter. The color of the area having pathological change is clearly noticed to be dark red. As the spectral band of the area having pathological change has higher light absorption, the color thereof is somewhat dull.

Figure 4E:
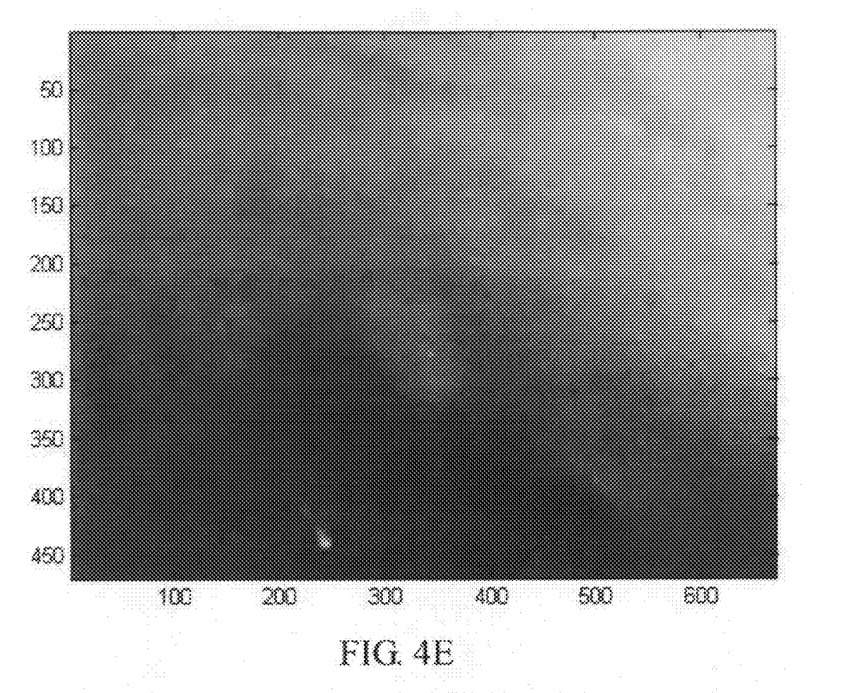
Figure 4F:
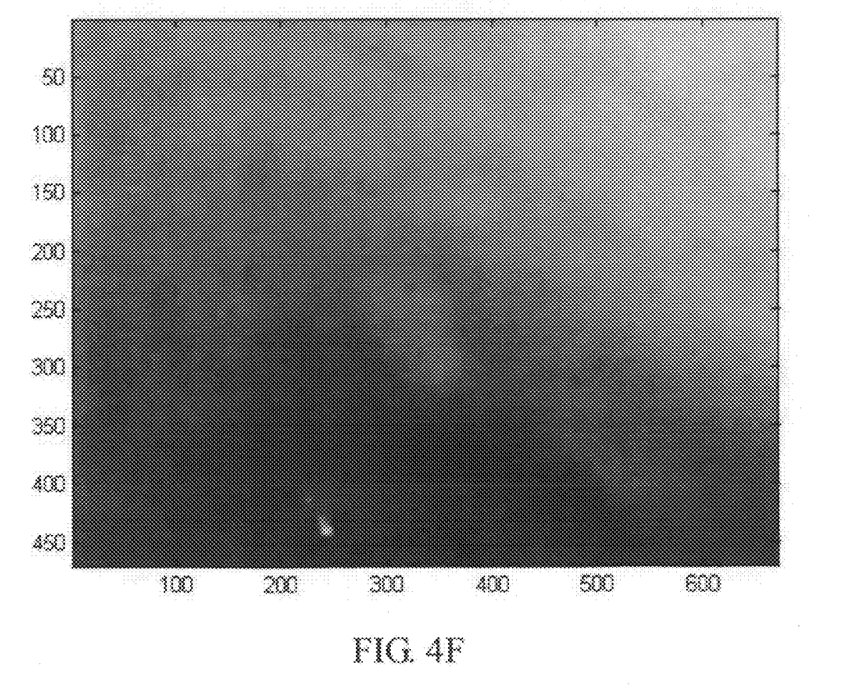

(E) and (F) The light sources are the bluish white LED collaborated with the blue filter and the bluish white LED collaborated with the yellow filter respectively. Due to the addition of the blue filter, the normal portion around the area having pathological change appears to be more white. As the background color of the oral tissue pertains to be a more reddish spectral band, wavelength difference between the red spectral band and the blue spectral band due to the addition of the blue filter is greater than that between the red spectral band and the yellow spectral band. The visual distinction is generated accordingly.

Figure 5A:
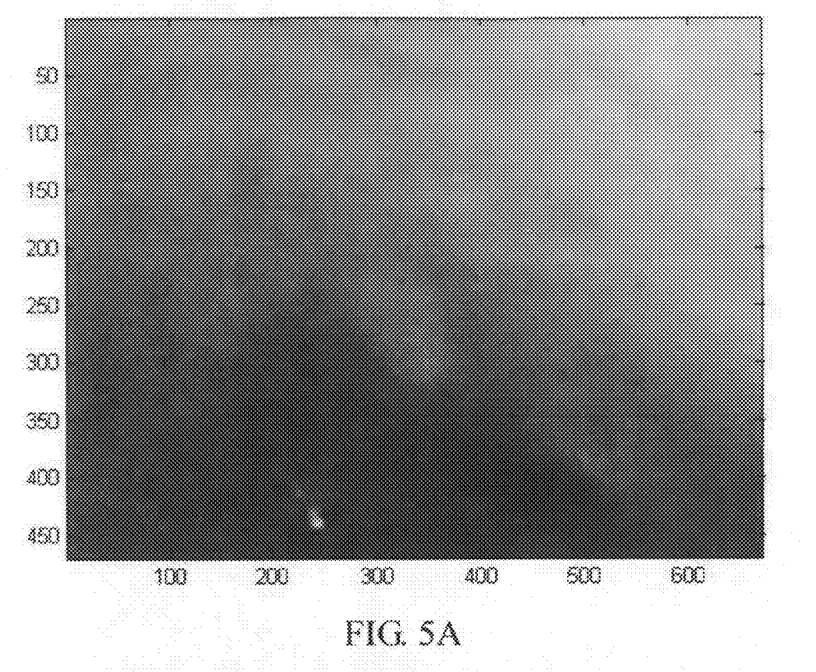
FIGS. 5(A)~5(E) is a series of oral cavity images taken by applying a white LED collaborated with different filters.
Figure 5B:
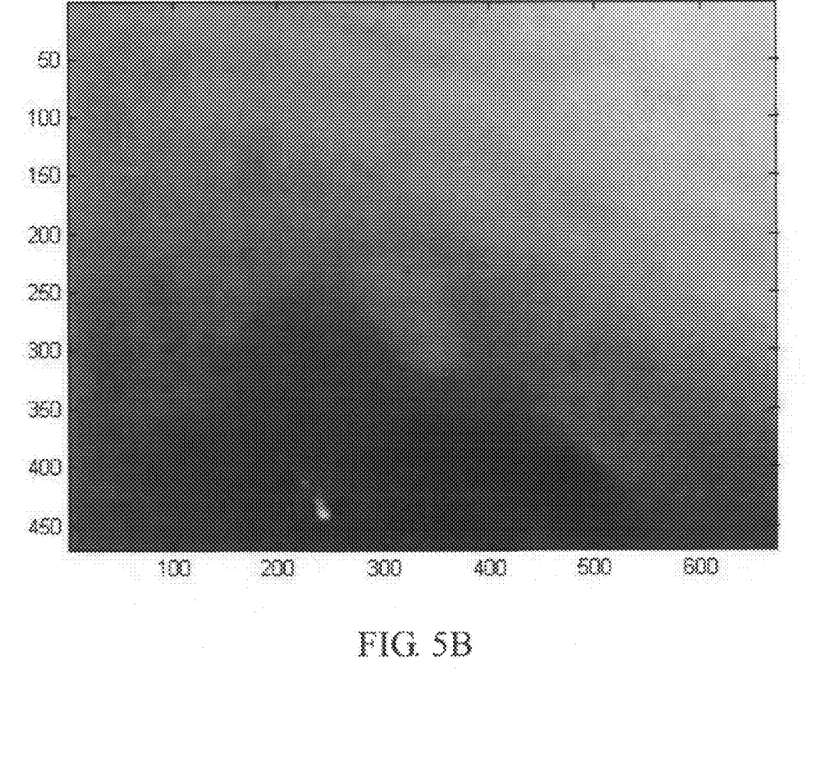
Figure 5C:
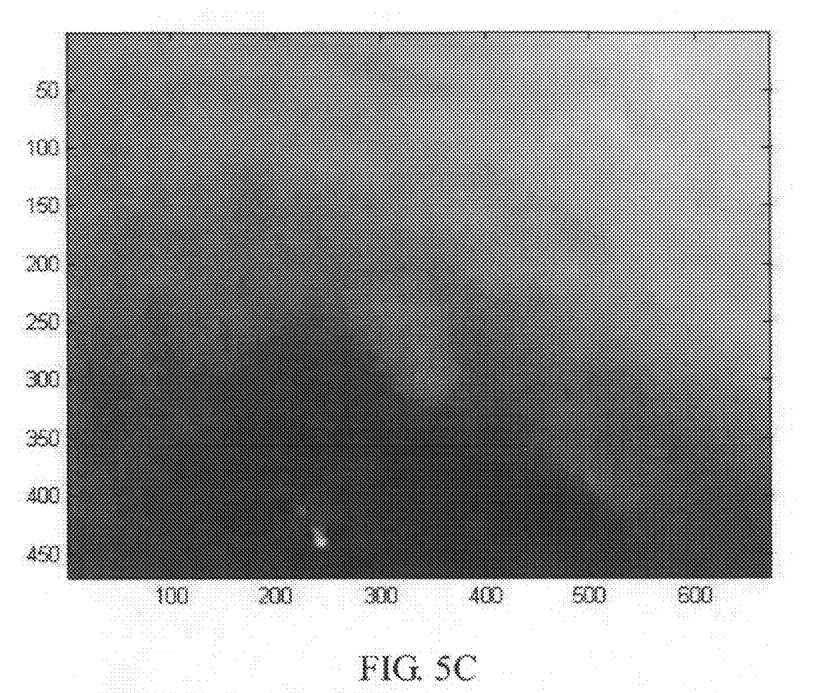
Figure 5D:
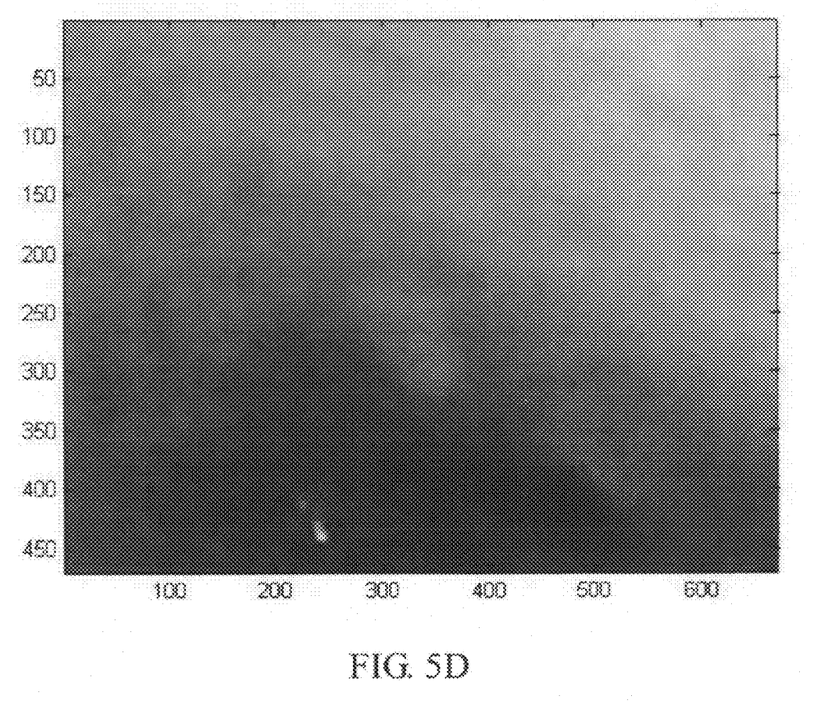
Figure 5E:
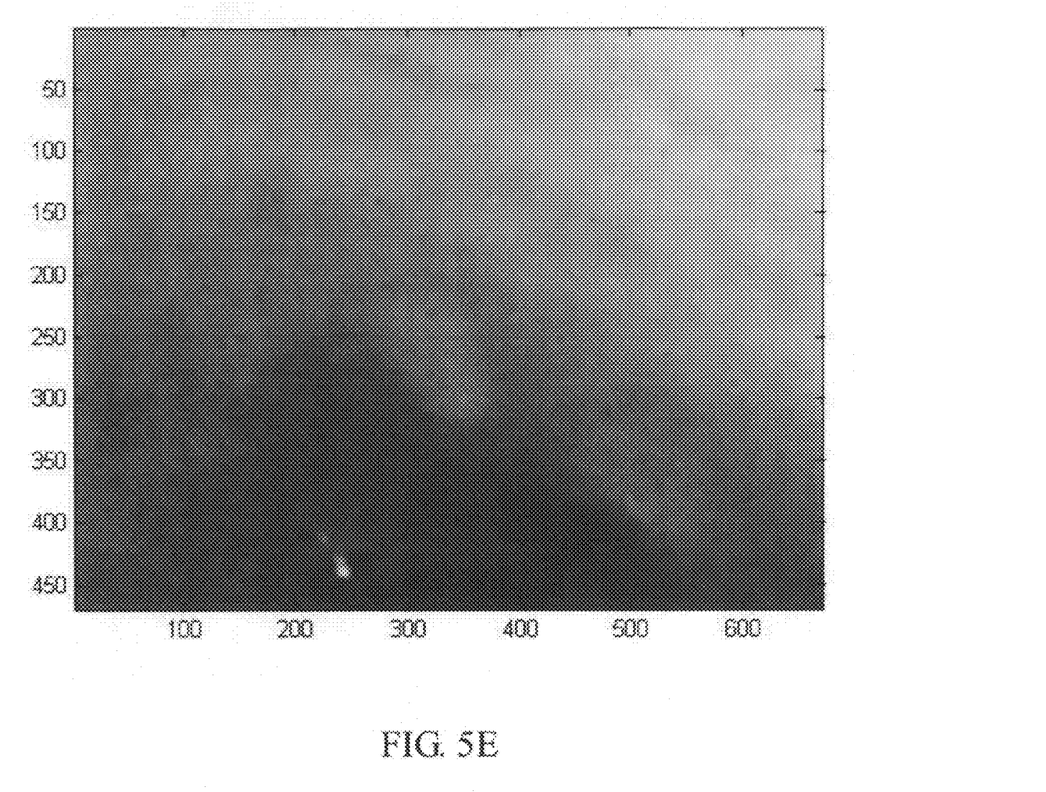

With reference to images in FIGS. 5(A)~5(E), in contrast to bluish white LED light sources, the light sources applied to all the images in FIG. 5 are white LED and have weaker effect. A possible reason for that is that bluish white LEDs have a blue spectral band whose signals are stronger than those of white LEDs. Hence, the images taken by applying the two different LED light sources vary because the area having pathological change absorbs light of different blue spectral bands illuminated by the two different LED light sources. The light source for FIG. 5(A) is a white LED. The light sources for FIGS. 5(B)~5(E) are a white LED respectively collaborated with a red filter, a green filter, a blue filter and a yellow filter. Similarly, the image of FIG. 5(B) appears to be reddish, and the background thereof is whiter when light of white LED passes through the blue filter.

With reference to the following table, data measured in association with chromatic difference between the area having pathological change and the normal area are presented as follows to prove that the effect of bluish white LEDs is better than that of white LEDs.

| Δ E Lab | LED | LED + red filter | LED + green filter | LED + blue filter | LED + yellow filter | Yellow flashlight |
|---|---|---|---|---|---|---|
| LED (Bluish) | 35.9920 | 25.4287 | 36.1972 | 47.5792 | 36.5460 | 31.3393 |
| LED (White) | 33.1847 | 28.2600 | 31.3702 | 41.4318 | 33.7840 | 31.3393 |

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A light source system for detecting oral cavity, comprising:
    an illumination module having
    a light-emitting diode (LED) unit serving to illuminate; and
    a power supply unit electronically connected to the LED unit to supply power to the LED unit; and
    a filter module mounted on an optical path of light illuminated by the LED unit to receive the light illuminated by the LED unit, filtering a received light to generate light of a required spectral band, and outputting the light having the spectral band located within coordinates represented by $x=0.22\pm0.05$ and $y=0.18\pm0.05$ of Commission Internationale de l'Eclairage (CIE) chromaticity coordinates.

2. The light source system as claimed in claim 1, wherein the LED unit has multiple white LEDs.

3. The light source system as claimed in claim 1, wherein the LED unit has multiple red, green and blue LEDs to generate white light mixed from light outputted from the multiple LEDs.

4. The light source system as claimed in claim 1, wherein the LED unit has multiple white LEDs and multiple red, green and blue LEDs.

5. The light source system as claimed in claim 1, wherein the power supply unit is an alternating current (AC) to direct current (DC) conversion circuit.

6. The light source system as claimed in claim 2, wherein the power supply unit is an AC to DC conversion circuit.

7. The light source system as claimed in claim 3, wherein the power supply unit is an AC to DC conversion circuit.

8. The light source system as claimed in claim 4, wherein the power supply unit is an AC to DC conversion circuit.

9. The light source system as claimed in claim 1, wherein the power supply unit has a plurality of rechargeable batteries.

10. The light source system as claimed in claim 2, wherein the power supply unit has a plurality of rechargeable batteries.

11. The light source system as claimed in claim 3, wherein the power supply unit has a plurality of rechargeable batteries.

12. The light source system as claimed in claim 4, wherein the power supply unit has a plurality of rechargeable batteries.

13. The light source system as claimed in claim 5, wherein the illumination module further comprises a charge-coupled device (CCD) unit.

14. The light source system as claimed in claim 6, wherein the illumination module further comprises a CCD unit.

15. The light source system as claimed in claim 7, wherein the illumination module further comprises a CCD unit.

16. The light source system as claimed in claim 8, wherein the illumination module further comprises a CCD unit.

17. The light source system as claimed in claim 9, wherein the illumination module further comprises a CCD unit.

18. The light source system as claimed in claim 10, wherein the illumination module further comprises a CCD unit.

19. The light source system as claimed in claim 11, wherein the illumination module further comprises a CCD unit.

20. The light source system as claimed in claim 12, wherein the illumination module further comprises a CCD unit.

21. The light source system as claimed in claim 5, wherein the filter module is a blue filter.

22. The light source system as claimed in claim 6, wherein the filter module is a blue filter.

23. The light source system as claimed in claim 7, wherein the filter module is a blue filter.

24. The light source system as claimed in claim 8, wherein the filter module is a blue filter.

25. The light source system as claimed in claim 9, wherein the filter module is a blue filter.

26. The light source system as claimed in claim 10, wherein the filter module is a blue filter.

27. The light source system as claimed in claim 11, wherein the filter module is a blue filter.

28. The light source system as claimed in claim 12, wherein the filter module is a blue filter.

\* \* \* \* \*